United States Patent [19]

Nakanishi et al.

[11] Patent Number: 4,891,492

[45] Date of Patent: Jan. 2, 1990

[54] MECHANISM FOR A ROBOT TOOL SUPPORT

[75] Inventors: Sadao Nakanishi; Hiroshi Nagashima; Kazuhiro Tomiyasu, all of Ise-shi, Japan

[73] Assignee: Shinko Electric Co., Ltd., Tokyo, Japan

[21] Appl. No.: 193,273

[22] Filed: May 11, 1988

[30] Foreign Application Priority Data

May 11, 1987 [JP] Japan .................................. 114284

[51] Int. Cl.⁴ ............................................. B23K 9/12
[52] U.S. Cl. ................................. 219/125.1; 901/41; 901/42
[58] Field of Search ................... 219/125.1; 901/42, 41

[56] References Cited

U.S. PATENT DOCUMENTS

| | | | |
|---|---|---|---|
| 4,221,953 | 9/1980 | Kiilunen | 219/125.1 |
| 4,629,860 | 12/1986 | Lindbom | 219/125.1 |
| 4,664,587 | 5/1987 | Case, Jr. et al. | 219/125.1 |

*Primary Examiner*—Clifford C. Shaw
*Attorney, Agent, or Firm*—Wenderoth, Lind & Ponack

[57] ABSTRACT

A tool support mechanism for a robot is adapted for carrying a tool, such as a welding torch. A series of shafts, pulleys and belts cooperate such that upon rotary input, a first arm rotates about a first end thereof with respect to a frame, a second arm rotatably connected at a first end thereof to a second end of the first arm translates but does not rotate with respect to the frame, and a tool support rotatably connected to a second end of the second arm translates but does not rotate with respect to the first arm. The mechanism thus allows a tool to be rotated about an axis spaced from the axis of rotary input.

2 Claims, 4 Drawing Sheets

MECHANISM FOR A ROBOT TOOL SUPPORT

FIELD OF THE INVENTION

The present invention relates to a tool support mechanism for welding or coating robots using rectangular coordinates.

DESCRIPTION OF THE PRIOR ART

FIG. 3 and FIG. 4 are side views of a body unit of a conventional welding robot using rectangular coordinates.

In both figures, 1 represents a base with a guide in the direction of the X-axis and 2 represents a frame on the base 1, the frame 2 being guided by the X-axis guide and having a Z-axis guide. 3 represents a frame supported by a member 4 and movable in the direction of the Y-axis, and 5 represents a motor for $\theta$-axis drive, mounted on the frame 3 with the rotary shaft ($\theta$-axis) 6 extending in the direction of the Z-axis. The shaft 6 supports a torch holder 7 at the end of the rotary shaft 6 which protrudes downwardly from the bottom surface of the frame 3. 8 represents a welding torch supported horizontally by the torch holder. FIG. 3 shows a case where the location of the from end 8A of the torch (welding point) is shifted a horizontal distance l from the centerline ($\theta$-axis) O of the rotary shaft 6.

FIG. 4 shows shows a case where the torch 8 is so supported by the torch holder 7 that the location (welding point) of the front end 8A of the torch coincides with the centerline ($\theta$-axis) O of the rotary shaft 6. FIG. 5 is a top view of the arrangement in FIG. 4.

The driving mechanisms for X-axis, Y-axis and Z-axis motion and their controls are not shown in the figures.

In FIG. 4, the front end 8A of the torch is kept on the centerline O with no change of the torch angle (an angle which the torch point and the welding torch makes) whereas in FIG. 3 the front end 8A of the torch is spaced the distance l from the centerline O so that the front end 8A of the torch makes a circular motion around the centerline O when the rotary shaft 6 is rotated.

To compensate for shift of the front end 8A of the torch, the conventional method involves the compensation of X- as well as Y-axis coordinates to offset the shift when the rotary shaft 6 is rotated.

Such compensations have such shortcomings as making the control of the drives and the motions more complex as the central processing unit (CPU) in the above control performs arithmetic operations for the compensation whenever compensation is to be made in order to actuate the X- and Y-axis drives according to the result of the arithmetic operations. An additional shortcoming is the increased possibility of interference between the unit and the work tool and the resulting limited space within which the welding torch 8 is moved. Thus, in the arrangement of FIG. 3, up to an additional 2 l is required for X-axis as well as Y-axis stroke as compared with the arrangement of FIG. 4 when work W (width x, depth y), as is shown in FIG. 6, is involved. However, in the arrangement in FIG. 4 the $\theta$-axis drive is located above the welding point such that when used with work W and a jig T as shown in FIG. 7 (a) and (b), the work, the jig and the drive interfere with each other.

SUMMARY OF THE INVENTION

The object of the present invention is to solve the above problems with a view to providing a tool support with an offset mechanism for the center of rotation which permits rotation of a work tool supported by a rotary shaft with a working point of the tool shifted from the center of the rotary shaft with the working point as the center of rotation.

To accomplish the above object, the present invention provides a rotary drive shaft extending from a frame arm and connected to one end of a first arm, a first support shaft rotatably mounted in the other end of the first arm and extending therefrom to connect to an end of a second support arm and a second support shaft rotatably mounted at the other end of the second support arm and extending therefrom to connect to the work tool. A first checking means checks the rotation of the first support shaft to maintain the second support arm parallel to the frame arm and a second checking means checks the rotation of the second support shaft to maintain the work tool parallel to the first support arm.

The present invention permits the center of rotation to the work point to be offset by means of a mechanism so that $\theta$-axis control can be accomplished without requiring compensatory control of the other axes. This results in simpler control, greater flexibility of use and reduces the possibility of interference with the work or the jig without sacrificing the stroke of other axes. These advantages are obtained economically by a simple mechanism.

DETAILED DESCRIPTION OF THE INVENTION

Figure 1:
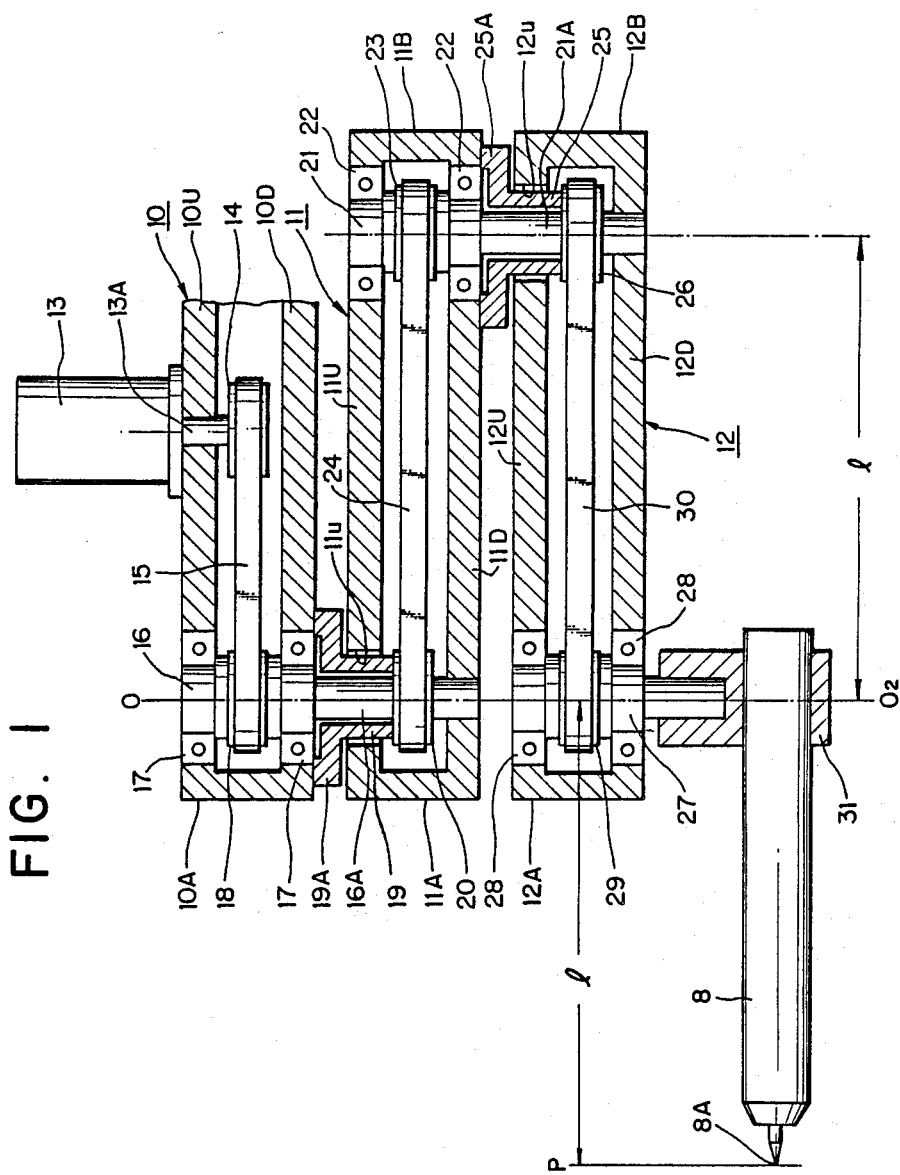
FIG. 1 is a longitudinal cross-section of the invention.

The invention is described with reference to the accompanying drawings as follows: In FIG. 1, 10 represents a horizontal frame (for example the Y-axis frame in a welding robot), 11 represents a first horizontal arm and 12 represents a second horizontal arm arranged in parallel. The frame and arms may advantageously have a rectangular cross-section.

13 represents a $\theta$-axis drive motor, for example in an automatic welding robot, fixedly carried on the top surface some distance away from a closed end 10A of the horizontal frame 10. A pulley 14 is mounted at the lower end of a rotary shaft 13A.

A stepped rotary drive shaft 16 adjacent to the closed end 10A of the horizontal frame 10, connected to the rotary shaft 13A through a belt 15, is provided with upper and lower bearings 17 fitted respectively in an upper plate 10U and lower plate 10D in the horizontal frame 10. A pulley 18 is secured to the rotary drive shaft 16 with the belt 15 being stretched over the pulleys 18 and 14.

The rotary drive shaft 16 has a somewhat slender extension 16A protruding from the lower plate in the horizontal frame 10, the extension 16A extending to a lower plate 11D of a first arm 11 to be connected unrotatably therewith after extending through a first vertical stationary shaft 19 which extends with clearance through a hole 11u bored in the neighborhood of a closed end 11A of the upper plate 11U in the horizontal arm 11.

The stationary shaft 19 is a hollow shaft having a mounting flange 19A which is fixed to a plate 10D in the horizontal frame 10, for example by bolting. Shaft 19 extends into and terminates in the horizontal first arm 11 and has a pulley 20 mounted at the lower end of the first stationary shaft.

Adjacent to an opposite closed end 11B of the horizontal arm 11, the first support shaft 21 is rotatably mounted by means of upper and lower bearings 22 fitted in the upper plate 11U and the lower plate 11D, respectively, in the horizontal arm 11. A first support pulley 23 is secured to the support shaft 21 with a belt 24 being stretched over the pulley 23 and the pulley 20. The first support shaft 21 is similar to the aforementioned rotary drive shaft 16 in having a somewhat slender extension 21A protruding from the lower plate 11D in the horizontal arm 11, the extension 21A being connected unrotatably to a lower plate 12D of a second arm 12. The extension 21A extends with clearance through the inside of a second vertical stationary shaft 25 which extends with clearance through hole 12u bored in the neighborhood of a closed end 12B of an upper plate 12U of the horizontal second arm 12. The second stationary shaft 25 is a hollow shaft having a mounting flange 25A which is fixed to the lower plate 11D in the horizontal arm 11, for example by bolting. The shaft 25 extends into and terminates in the horizontal arm 12 with a second pulley 26 secured at the lower end of the second stationary shaft.

Adjacent to another closed end 12A of the horizontal arm 12, a second support shaft 27 is rotatably mounted by means of upper and lower bearings 28 fitted respectively in the upper plate 12U and the lower plate 12D in the horizontal frame 12. A second support pulley 29 is secured on the second support shaft 27. A belt 30 is stretched over the pulley 29 and the pulley 26.

The second support shaft 27 also has an extension 27A to which a tool holder 31 is connected for supporting, for example, a welding torch 8.

The distance between the rotational centerline O of the rotary drive shaft 16 and the centerline of the first support shaft 21 is so arranged as to be equal to the distance l between the centerline of the second support shaft 27 and the centerline of the first support shaft 21 and arranged also so as to equal the distance between the centerline of the second support shaft 27 and a front end 8A of the welding torch 8.

The operation of the tool support mechanism is described below in reference to FIG. 2.

Figure 2:
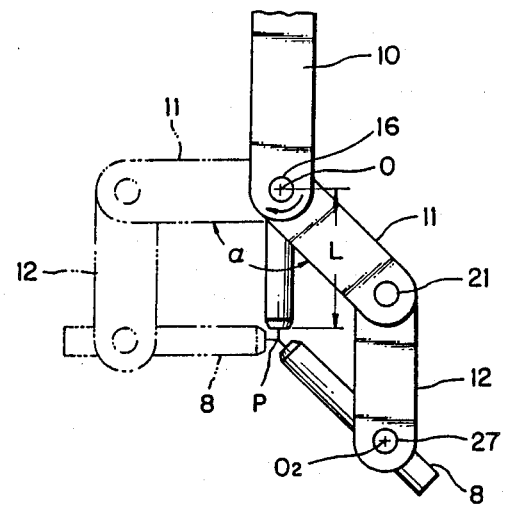
FIG. 2 is a schematic diagram of the actions of the invention.
Figure 3:
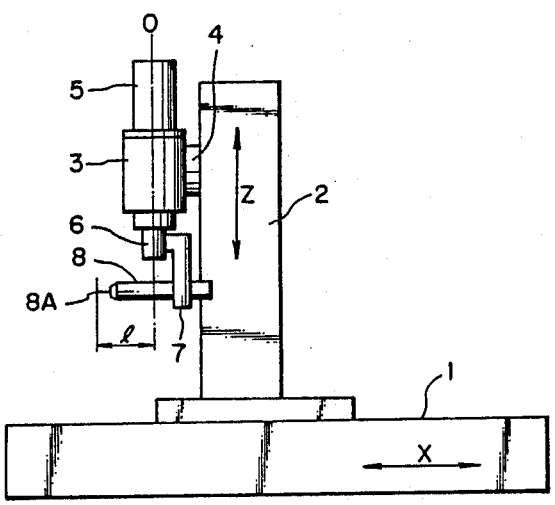
FIGS. 3 and 4 are side views of a conventional welding robot.
Figure 4:
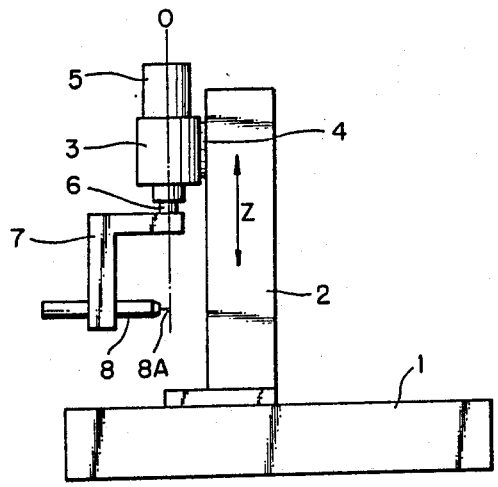
Figure 5:
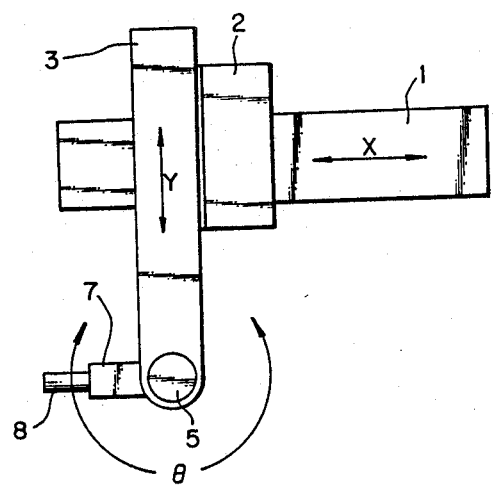
FIG. 5 is a plane view of the device of FIG. 4.
Figure 6:
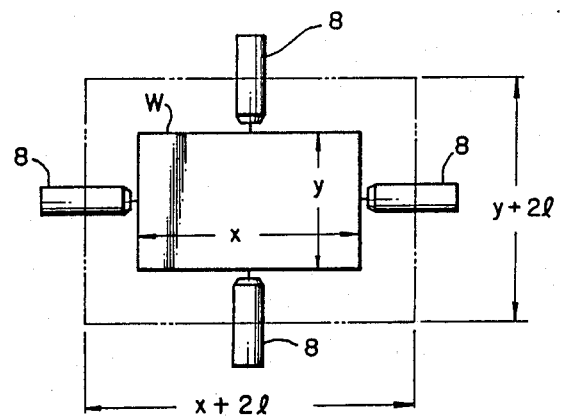
FIG. 6 is a plane view of work and tool placements in the above conventional welding robot.
Figure 7A:
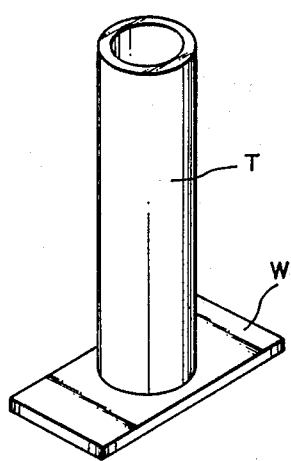
FIG. 7 (a) and (b) are perspective views of work and a jig.
Figure 7B:
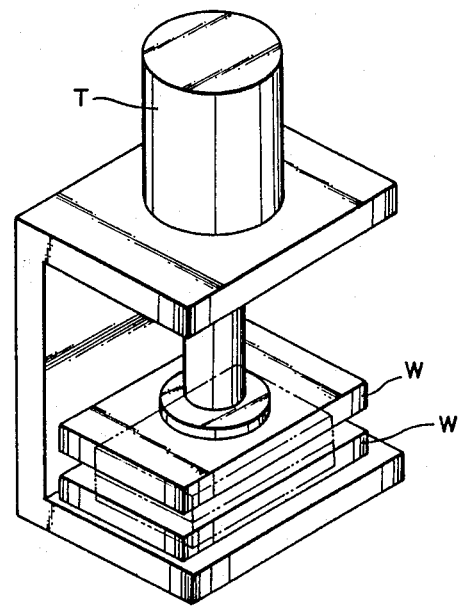

It is initially assumed that the horizontal frame 10, the first horizontal arm 11 and the second horizontal arm 12 are in such position relative to each other as is indicated by the solid line in FIG. 2.

When the motor 13 is driven to turn the rotary shaft 13A an angle α degrees in the direction of the arrow in FIG. 2, the rotation is transmitted to the rotary drive shaft 16 through the pulley 14, belt 15 and pulley 18 arrangement to turn the shaft 16.

When the rotary drive shaft 16 is rotated, the first horizontal arm 11 supported at the end of the shaft 16 turn an angle α around the axis O of the rotary drive shaft 16.

The welding torch 8 is at all times kept in a position parallel to the first horizontal arm 11 because the torch is connected to the first horizontal arm 11 through a checking mechanism for the rotation of the support shafts consisting of tool holder 31, second support shaft 27, pulley 19, belt 30, pulley 26, and second stationary shaft 25 fixed to the first arm.

On the other hand, the second arm 12 is connected to the horizontal frame 10 through a checking mechanism for the rotation of the support shafts consisting of the first support shaft 21 supporting the arm, pulley 23, belt 24, pulley 20, and first stationary shaft 19 fixed to the horizontal frame 10 so that the second horizontal arm is at all times kept in a position parallel to the horizontal frame 10, even when the horizontal arm 11 turns.

Thus, when the rotary drive shaft rotates, the first horizontal arm 11 rotates around the axis O of the rotary drive shaft 16 and the second shaft 27 orbits around the position P at a distance l from the axis O of the horizontal frame 10 and the welding torch 8 turns at an angle equal to that of the first first horizontal arm, keeping in parallel with the horizontal arm 11 so that the welding torch 8 turns around the front end 8A of the torch.

In the present invention, though the front end 8A of the torch 8 and the rotational centerline O of the rotary drive shaft 16 do not coincide, the welding torch turn around the front end 8A of the torch instead of around the rotational center O of the rotary drive shaft 16 so that where the rotary drive shaft 16 is the θ-axis of the automatic welding robot,
1. no need arises to compensate with X-axis and Y-axis movements as described above with regard to prior art devices; and
2. the possibility of interferences with the work or workrelated jig can be reduced without sacrificing the strokes of other axes, such as X-axis, Y-axis.

The description of the above invention has been centered around the effects when applied to a welding robot.

The present invention yields similar effects when applied to automatic working or operating equipment or the like with other work tools.

In the present invention, the composition of the horizontal frame, the two horizontal arms and the arrangement of the aforementioned check mechanism for the rotation of the support shaft are not limited to the above foregoing embodiment.

We claim:
1. A tool support mechanism for a robot, comprising:
a frame;
a first cylindrical stationary shaft fixed to said frame;
a first ring-shaped pulley fixed to a free end of said first stationary shaft;
a rotary drive shaft extending from said frame and through said first stationary shaft and said first pulley, said first stationary shaft and said first pulley being substantially concentric to and spaced from said drive shaft;
a first arm fixed to a free end of said drive shaft at a first end of said first arm;
a second cylindrical stationary shaft fixed to a second end of said first arm;
a second ring-shaped pulley fixed to a free end of said second stationary shaft;
a first support shaft rotatably mounted in said second end of said first arm and extending from said first arm and through said second stationary shaft and said second pulley, said second stationary shaft and said second pulley being substantially concentric to and spaced from said first support shaft;

a first support pulley fixed to said first support shaft;

a first belt connecting said first pulley and said first support pulley;

a second arm fixed to a free end of said first support shaft at a first end of said second arm;

a second support shaft rotatably mounted in and extending from a second end of said second arm;

a second support pulley fixed to said second support shaft;

a belt connecting said second pulley and said second support pulley; and a tool support fixed to a free end of said second support shaft, whereby rotation of said drive shaft causes rotation of said first and second arms with respect to said frame for moving said tool support about a workpiece.

2. A mechanism as in claim 1, wherein said drive shaft, said first support shaft and said second support shaft are substantially parallel, and the distance between said drive shaft and said first support shaft substantially equals the distance between said first support shaft and said second support shaft.

* * * * *